G. H. GILLETTE.
RUBBER TIRE.
APPLICATION FILED NOV. 28, 1910.
1,004,642.
Patented Oct. 3, 1911.
2 SHEETS—SHEET 1.
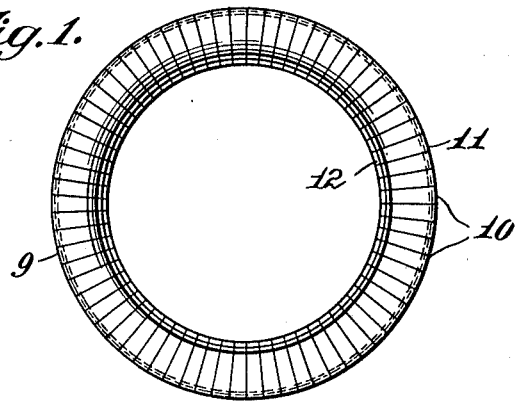
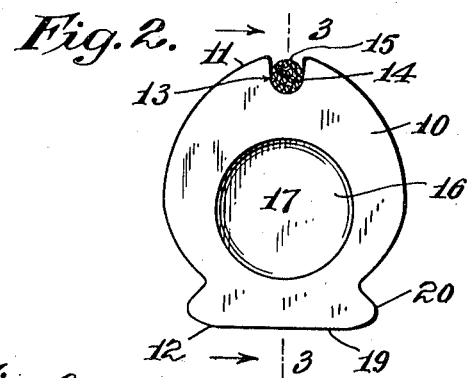
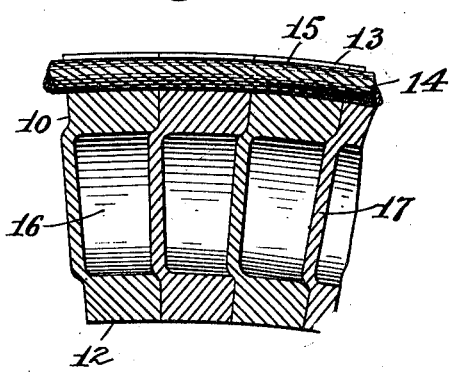
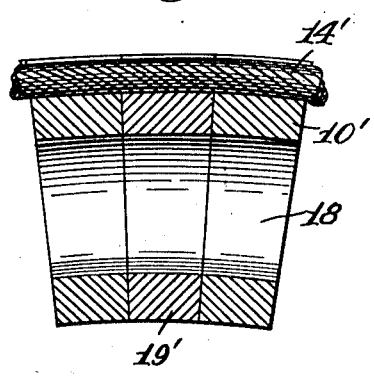
Attest:
Inventor:
George H. Gillette.

G. H. GILLETTE.
RUBBER TIRE.
APPLICATION FILED NOV. 28, 1910.
1,004,642.
Patented Oct. 3, 1911.
2 SHEETS—SHEET 2.
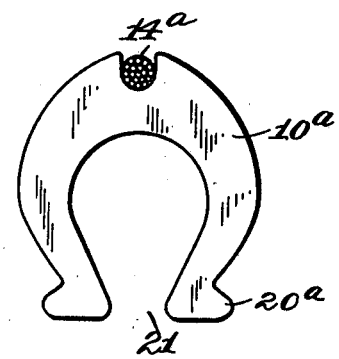
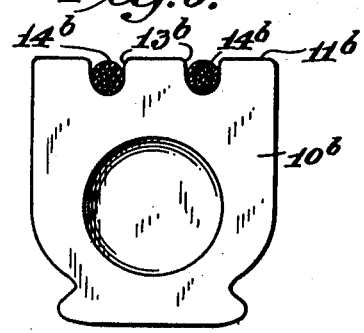
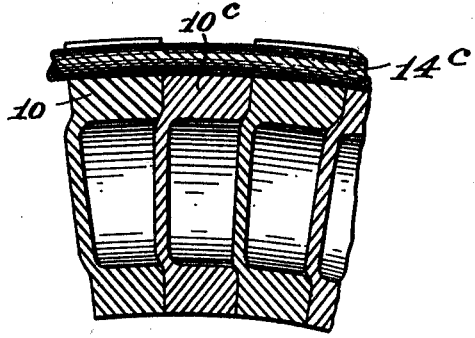
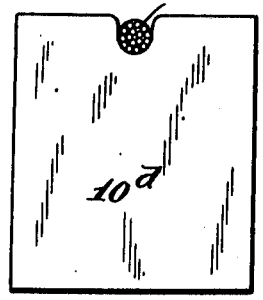
Attest:
Inventor:
George H. Gillette.
by
Atty.

UNITED STATES PATENT OFFICE.

GEORGE H. GILLETTE, OF NEW YORK, N. Y.

RUBBER TIRE.

1,004,642.　　　　　Specification of Letters Patent.　　　Patented Oct. 3, 1911.

Application filed November 28, 1910. Serial No. 594,517.

*To all whom it may concern:*

Be it known that I, GEORGE H. GILLETTE, a citizen of the United States, residing at New York, in the county and State of New York, have invented a new and useful Rubber Tire, of which the following is a specification.

This invention relates to tires for vehicle wheels, and especially to that class made of resilient material, as rubber, and the object of the invention is to provide a tire composed of rubber, or suitable resilient material, made in sections and so constructed and held together that a continuous tire is formed out of the sections which will be held together even when not on a vehicle wheel thereby enabling the tire to be handled as any tire molded in a continuous ring.

A further object is to provide a sectional rubber tire with holding means whereby the several sections when mounted together would form a very resilient, or elastic tire, and in which either special means could be provided to make the tires yielding in use, or a pneumatic tube could be used with the sections.

The invention is illustrated in the accompanying drawings in which—

Figure 1, is a side elevation of a tire constructed according to my invention; Fig. 2, is a face view of one of the sections, and a sectional view of the holding means; Fig. 3, is a sectional view, of several sections, taken on the line 3—3 of Fig. 2; Fig. 4, is a view similar to Fig. 3, but showing the tire adapted to receive a pneumatic tube; Fig. 5, is a face view of one of the sections with an open bottom adapted to receive a pneumatic tube; Fig. 6, is a face view of a section showing a modified form of construction, and a sectional view of the holding means, also showing a modification; Fig. 7, is a sectional view of another modified form of construction; and, Fig. 8, is a face view of a section showing another modification.

In the drawings, the several parts of my invention are indicated by numerals of reference.

In practice I provide a rubber tire 9, as shown in Fig. 1, composed of a plurality of sections 10, which are substantially wedge-shaped, each being thicker at the tread, or outer end 11, than at the inner end 12, whereby when the sections are secured together in sufficient number to form a tire the tire formed will be a ring if the sections are inserted without compression, or if the compression is substantially equal from the top to the bottom of each section. In the top, or tread part of each section I form a notch, or groove 13, adapted to receive a cable or ring 14, for purposes hereinafter described, the said groove being preferably proportioned in size so that when the cable or ring 14, is mounted therein the rubber of the tire will project above the periphery 15, of the ring, so that in use the ring will not contact with the ground unless the rubber be greatly compressed.

In forming the tire I provide a sufficient number of sections 10, to form a complete circle, which will be slightly less than the required diameter of the tire desired. In the grooves 13, of the several sections I mount the ring, which has preferably been previously formed, although if desired, the ring 14, may be formed, or spliced together after being mounted in the grooves. After the ring 14, is in place I insert a number of sections 10, by pressing apart in any desired manner the sections already in place a sufficient distance to allow the additional sections to be inserted. In practice I find that if the number of sections required to form a ring-shaped tire should be 64, eight additional sections can be inserted in this way to form a completed tire of the required compression and rigidity.

By inserting the sections as just described, since the sections are all wedge-shaped from top to bottom, the inserted sections will compress the sections already in place with a tendency to force them outward against the ring, as the sections are wedge-shaped and all compressed equally. This will serve to place strain on the ring 14, and a binding action of the same in the groove 13, so that the sections will now be held in a very firm manner, as will be readily understood, whether on a wheel, or for shipping as an article of manufacture; and in this way I provide a tire composed of separable parts which may be treated in practically all respects as an ordinary tire molded in a single piece. At the same time, I have the advantage of being able to remove any part of the tire which may be worn, or have become useless without having to throw away the entire tire. Then, too, constructed in this way, the rubber will be compressed to a certain extent which will add to the resistance, or resiliency of the same in use.

As constructed, I may add to the resiliency, or cushioning effect of the tire in several ways. The preferred way is to provide each section 10, with a substantially hollow center 16, with a thin diaphragm 17, across one end, which is preferably made hub-shaped, as shown in Figs. 3, and 7, so that it will enter the cavity 16, in the next section when in place, and in this way will serve to center the sections and also as a support to a certain extent of the walls of the cavity at the open end. Instead of these webs, or diaphragms 17, I may form a continuous passageway 18, through the sections 10', as shown in Fig. 4, which may be left without any filling contents, and it is evident, also, that in this construction an air tube, or any desired filling material may be inserted in this space in the completed tire.

In Fig. 2, I have shown the sections with a closed inner end 19, while the usual ribs, or flanges 20, are formed for securing the tire, when formed, to a wheel; and in Fig. 4, the ends 19', are also closed, as shown.

In Fig. 5, I have shown another modified form in which the sections 10ª, have an open bottom 21, which may be utilized for the insertion of an air tube, as will be readily understood. The sections when formed into a tire will be held together by a cable or ring 14ª, and the tire may be secured to a wheel by the flanges 20ª, as will be readily understood. This tire, when formed, can be treated in every respect as the ordinary pneumatic tire covering is treated.

In Fig. 6, I have shown another modification in which the section 10ᵇ, has a straight, or substantially straight top 11ᵇ, and is provided with two notches or grooves 13ᵇ, in which are mounted two holding cables or rings 14ᵇ. It is evident that any number of grooves, and a corresponding number of cables or rings could be used with any of the forms shown.

In Fig. 7, another modified form is shown in which the sections 10, are interposed by sections 10ᶜ, of a length to simply contact with the under side of the cable or ring 10ᶜ. In this construction the outer end of every other section, or the sections 10, would form the tread of the tire while the outer ends of the sections 10ᶜ, would not come in contact with the road.

In Fig. 8, I have shown a section 10ᵈ, rectangular in form, and solid throughout. Such sections with any desired number of holding cables or rings 14ᵈ, may be used with heavy vehicles as will be readily understood.

It will thus be seen that I have provided a tire composed of sections which can be used as any ordinary tire, while, at the same time, I have provided a tire which is easy to form, repair, and interchange, and efficient in use.

Having thus described my invention, what I claim as new and desire to secure by Letters Patent of the United States is—

1. A rubber tire comprising a plurality of sections of resilient material, and an externally-mounted retaining ring, said tire having a greater number of said sections than normally required to form a continuous circle of the diameter of said retaining ring whereby the said sections are held in place in a compressed condition.

2. A rubber tire comprising a plurality of sections of resilient material, and an externally-mounted retaining ring, said tire having a greater number of said sections than normally required to form a continuous circle of the diameter of said ring whereby the said sections are held in place in a compressed condition; said retaining ring lying within the plane of the periphery of the tire whereby it is normally protected from contact with the road.

3. In a rubber tire, a section having a substantially hollow center, and a web, or diaphragm extending across one side of said center.

Dated this 26th day of November, 1910.

GEORGE H. GILLETTE.

Witnesses:
   G. P. VAN WYE,
   HAROLD LETH.